United States Patent
Hamy

[11] 3,941,239
[45] Mar. 2, 1976

[54] TRANSPORTATION SYSTEM
[75] Inventor: Norbert Hamy, Beaconsfield, Canada
[73] Assignee: Trebron Holdings Limited, Beaconsfield, Canada
[22] Filed: Jan. 11, 1974
[21] Appl. No.: 432,488

[30] Foreign Application Priority Data
Jan. 13, 1973 United Kingdom.............. 1900/73

[52] U.S. Cl. ................ 198/184; 198/191; 198/201
[51] Int. Cl.² ........................................ B65G 15/00
[58] Field of Search ...... 198/201, 191, 184, 1, 195, 198/196, 193

[56] References Cited
UNITED STATES PATENTS

| | | | |
|---|---|---|---|
| 340,280 | 4/1886 | Broadnax............................ | 198/193 |
| 3,583,551 | 6/1971 | Barnish.............................. | 198/184 |
| 3,734,271 | 5/1973 | Dolgolenko et al. ............... | 198/191 |

Primary Examiner—James B. Marbert
Assistant Examiner—Douglas D. Watts
Attorney, Agent, or Firm—Robert J. Schaap

[57] ABSTRACT

A transport system having a collapsible support body, flexibly coupled loop segments forming a continuous loop disposed above the collapsible support body, and air-bearing space intermediate the continuous loop and support body, means for supplying pressurized air to the support body and hence to the air-bearing space, drive means and side-sealing means. The system provides a portable transport system which may be easily assembled, disassembled, and stored in a minimum of space. According to a further aspect, there are provided for side-sealing means comprising first and second means disposed on the continuous loop and support body, these means minimizing the loss of air from the air-bearing space and entailing very little friction.

24 Claims, 10 Drawing Figures

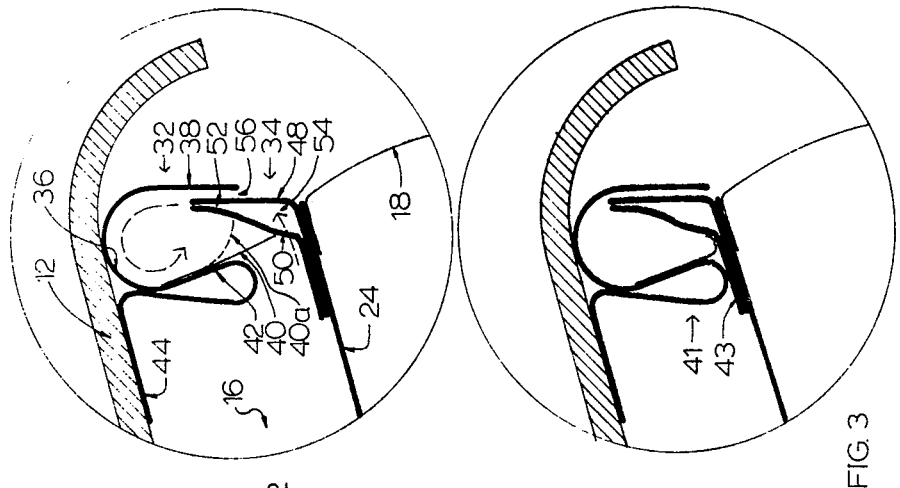
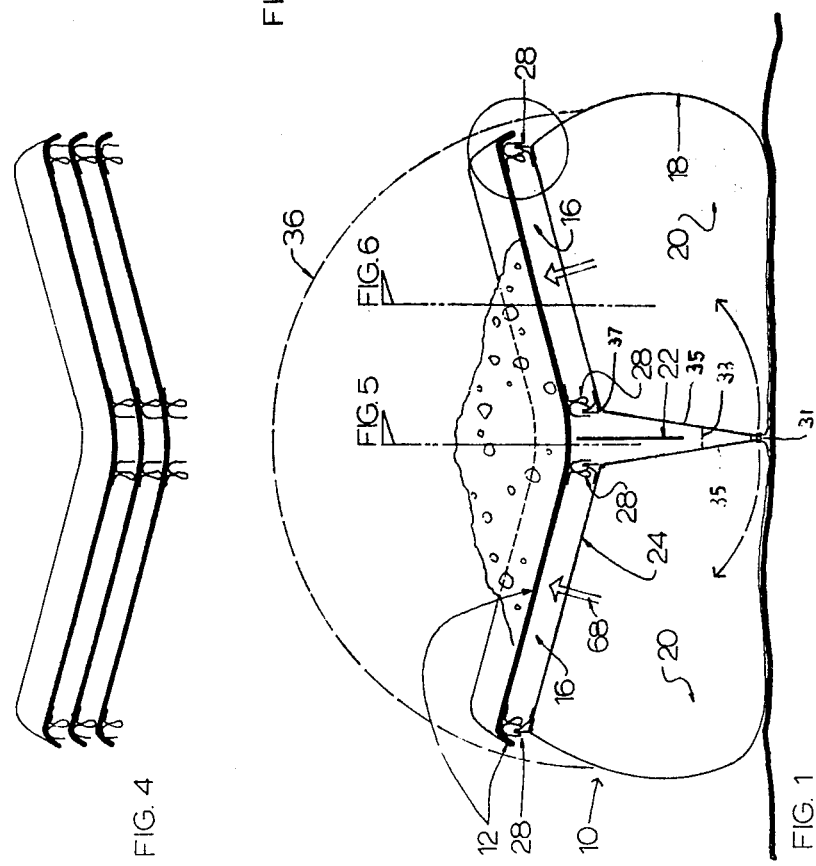

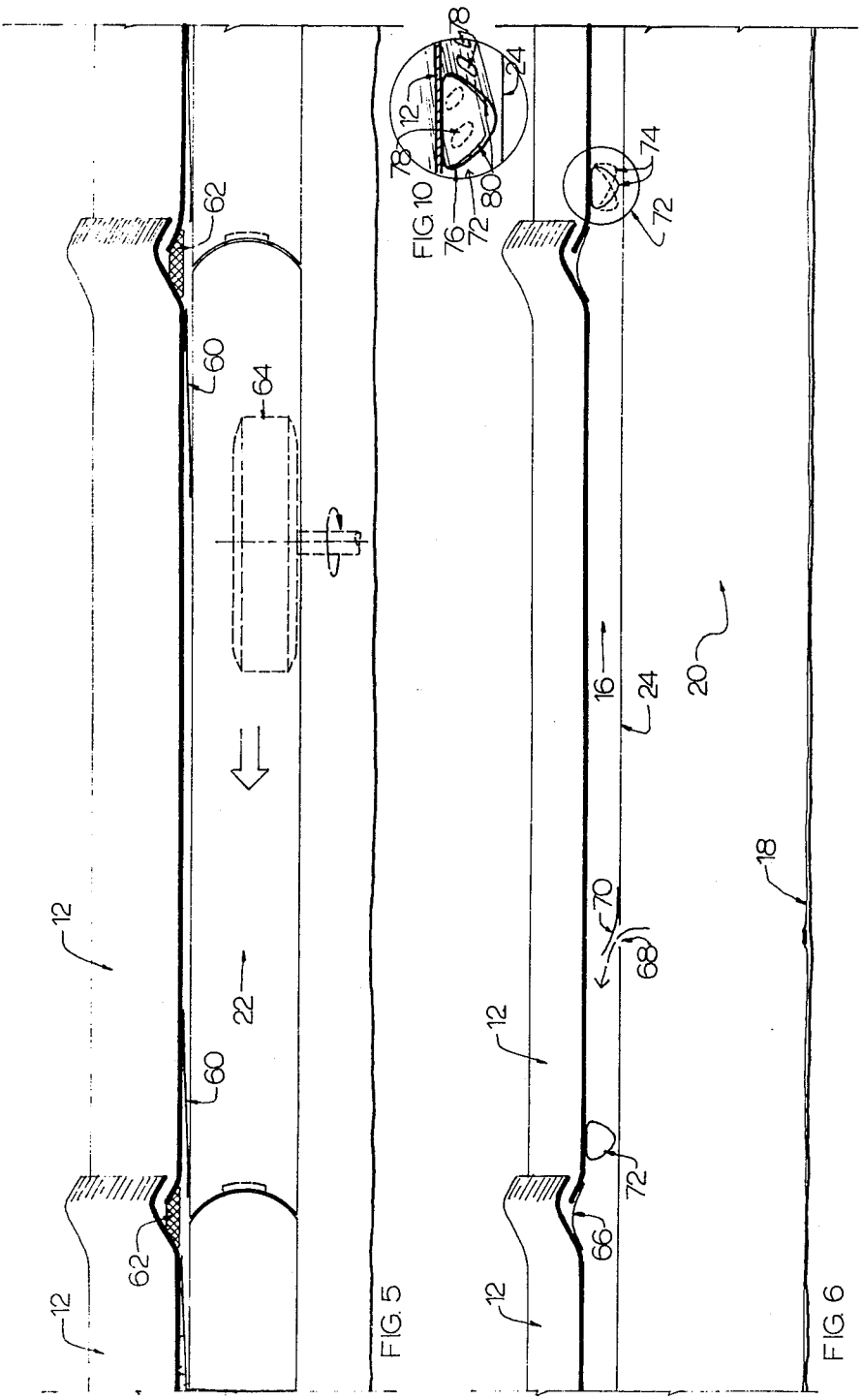

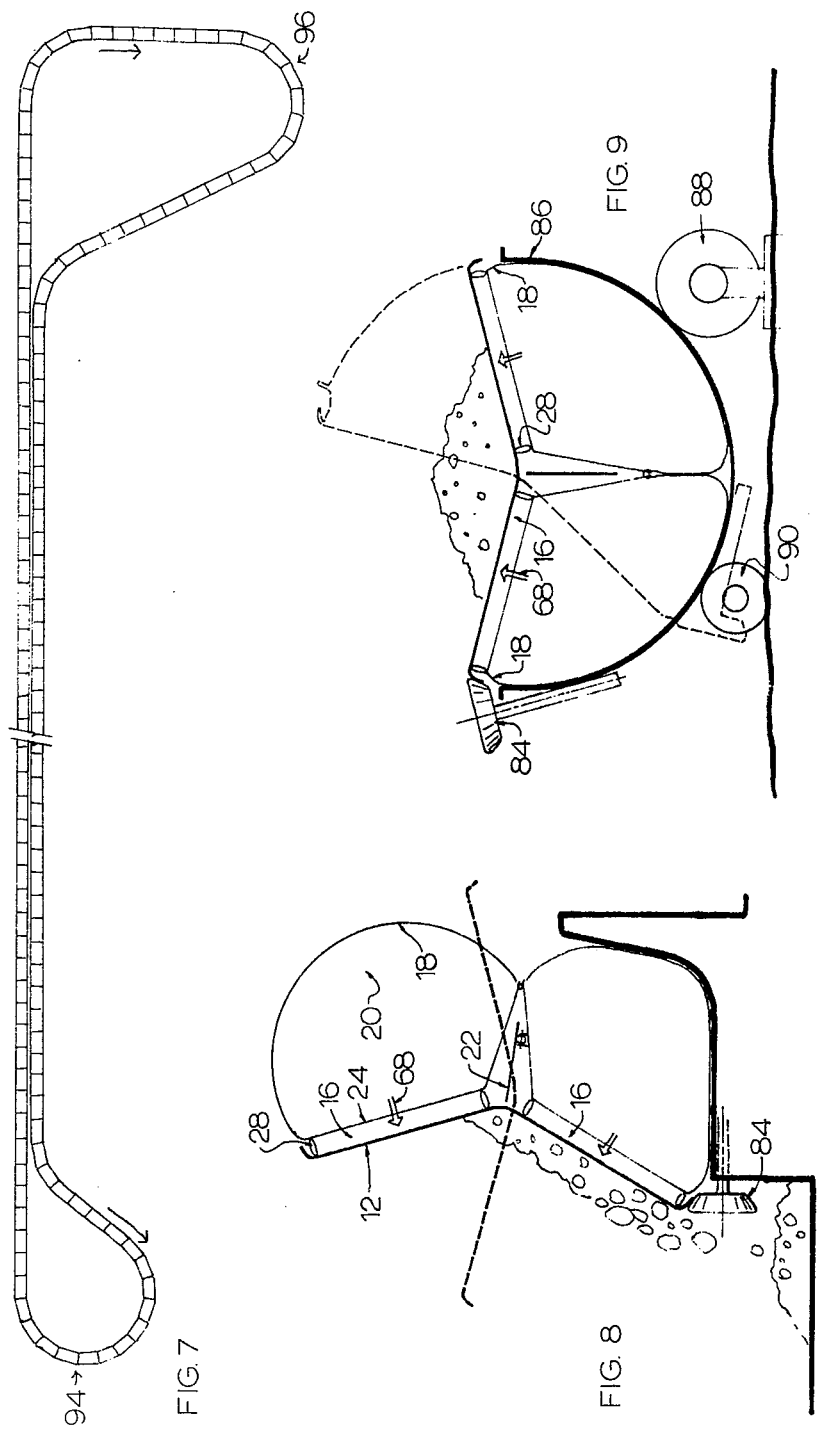

TRANSPORTATION SYSTEM

This invention relates in general to certain new and useful improvements in transport systems, and more particularly, to portable freight transport systems and side-sealing means therefor.

The movement of freight and/or people has become a rather complex problem particularly when it is only necessary to transport either the people or freight on a temporary or incremental time basis. For example, in the case of remotely located construction sites, it is often necessary to build a temporary road from a main access road to the temporary site. This road is then used for the transport of material and/or people in land travel vehicles. However, after the construction at the temporary and often remote site is completed, the temporary access route may often serve no further useful purpose.

In similar manner, it is often necessary to construct temporary transport systems at a construction site for movement of material. Again, after the material has been moved, these temporary transport systems must then be disassembled and moved to a storage area or other site of utilization.

The building of an access road is time-consuming and costly and as such, materially adds to the overall cost of the construction itself. Even when access routes are not required, the construction of a temporary transport system is in itself quite costly and again materially adds to the overall cost of the constructed object.

One frequent usage of temporary transport systems is in the transportation of logs from a timber forest. In these cases, temporary access roads must be built and conveyor equipment must often be assembled at a site of utilization in order to remove the trees which have been cut down. However, after this section of the timber forest has been cleared, the road itself usually serves no further purpose and in addition, the temporary transport system must be disassembled and hauled away. The assembly and disassembly of the conveyor system plus the equipment needed to convey the components of the system to and from the site of utilization is expectedly quite costly.

Accordingly, it is an object of this invention to provide for a transport system adapted for use as a portable freight transport system, this transport system lending itself to easy assembly and disassembly.

It is a further object of this invention to provide an air-supported transport system adapted to operate under low pressure and which may be utilized to carry many commodities thereon including bulk payloads.

A still further object of this invention is the provision of a collapsible transport system which lends itself to disassembly whereby the individual components may be stacked in vertical layers so that the system may be easily delivered to any required site.

A still further object of this invention is the provision of a portable transport system requiring little preparation for its operation and which may be adapted to unload the payload thereupon automatically.

According to a still further aspect of the present invention, there is provided for novel side-sealing means adapted for use in any air-supported transport system, the novel side-sealing means adapted to minimize air loss from an air-bearing space, the side-sealing means further reducing friction encountered in conventional side-sealing arrangements.

Generally, the transport system of the present invention may be characterized as comprising a collapsible support body, a continuous loop of flexibly coupled rigid segments, said continuous loop being disposed above said support body for at least a portion of its length, an air-bearing space intermediate said continuous loop and said support body, means for supplying a source of pressurized air to said support body, means associated with the surface of said support body over which said continuous loop passes for supplying pressurized air therefrom to said air-bearing space, drive means operatively associated with said continuous loop for driving the same, and side-sealing means operatively associated with said continuous loop and said support body.

In greater detail, the support body utilized in the present invention is of a collapsible nature and is formed of a flexible material. Such materials are well known in the art and thus, any flexible plastic material may be utilized. Operationally, the support body is adapted to receive a source of pressurized gaseous material which inflates the support body.

Although, for some usages, the support body may comprise an integral one-piece unit, a more conventional arrangement comprises a plurality of units. Thus, in its longitudinal direction, the support body preferably comprises a series of the same. Conventional means interconnecting the units may be employed.

In a further aspect, the support body may comprise two or more longitudinally parallel "air bags". In this embodiment, the upper surfaces of the air bags over which the continuous loop passes may be somewhat inclined with respect to each other so as to form a V-shaped configuration, with the base of the V being intermediate the two parallel air bags.

The continuous loop of flexibly coupled rigid segments is adapted to be placed over the uppermost surface of the collapsible support body. As mentioned, each of these segments is interconnected with adjacent segments so as to provide a relatively air-impervious construction. In this respect, reference may be made to co-pending U.S. application Ser. No. 184,831, filed Sept. 29, 1971.

As discussed above, the transport system of the present invention comprises means for supplying a source of pressurized gaseous material to the air bags forming the support body. As used in this application, and the claims, when a reference is made to pressurized air or the like, it is recognized that any suitable gaseous material may be employed, air being the most common. The means employed to supply the pressurized air to the support body may be any which are suitable and well known to those skilled in the art. Depending on the length of the transport system, the means employed may be at spaced-apart intervals such as one-half mile. The feature of this invention is that the pressurized air supply may be at a relatively low pressure — e.g. 1 pound per square inch or so. The means for supplying the same may comprise compressors or the like.

Defined intermediate the underside of the continuous loop formed of the flexibly coupled relatively rigid segments and the upper surface of the support body is an air-bearing space, which forms the support for the continuous loop. In order to supply pressurized air to the air-bearing space, apertures may be provided within the top surface of the support body or, in a preferred aspect, the upper surface of the support body or air bags may be of an air pervious material. Thus, a continual supply of pressurized air from the means supplying the air bags is provided. Air pervious materials may be used which are well known to those skilled in the art.

According to the present invention, side-sealing means are employed at the longitudinally extending sides of the support body and the continuous loop. These side-sealing means are adapted to substantially reduce the escape of air from the air-bearing space. In one embodiment, these side-sealing means may take the form of a sprung member depending from either the continuous loop or the collapsible support body.

Means for driving the continuous loop of rigid segments may be of any desired form. In one aspect particularly directed towards the embodiment wherein two parallel longitudinally extending air bags are employed, a drive strap extending from the base of the V-shaped continuous loop may form one component of the drive means. Coupled with this there may be suitable traction wheels mounted at spaced-apart intervals adapted to drive the above-mentioned drive strap. Other drive means such as linear motors or the like may equally be employed.

A feature of the present invention provides for a transport system which may be adapted to automatically unload the commodity mounted thereupon. Thus, the system of the present invention may be mounted in such a manner that at a desired point or points, the support body may be tilted or inclined with respect to the horizontal such that the commodity mounted upon the continuous loop will tend to slide or roll off the continuous loop at this point or points. This feature is permitted due to the use of the flexible air bags as will be discussed in greater detail hereinafter.

In a further aspect, the air bags forming the support body of the present invention may have a foundation associated therewith. For many usages discussed above, the employment of a foundation is not practical and the transport system will be employed as discussed hereinabove. However, when used in a relatively fixed environment, a foundation surrounding the bottom and sides of the collapsible air bags may be employed.

In this aspect the foundation may have, mounted on its uppermost side walls, means for sloping or inclining the continuous loop so as to unload the commodity mounted thereupon as will be discussed in greater detail.

A further feature of the transport system of the present invention is that the system may be easily disassembled and stacked in a very compact configuration. Thus, when employing a plurality of air bags forming a support body, the segments forming the whole may be disassembled, and when the pressurized air is released therefrom, form a very compact arrangement occupying very little more space than would be occupied by the continuous loop itself.

In prior art air-supported transport systems, the problem has arisen relating to the maintenance of the air pressure within the air-bearing space. In other words, although the top and bottom of the air-bearing space may be formed so as to be air impervious, the sides intermediate the support body and the carrier belt have heretofore contributed greatly to the loss of air pressure from within.

Previous proposals to minimize the loss of air pressure from the air-bearing space have included one or more contact strips located along the longitudinal edges of the air-bearing space so as to provide a sealing arrangement. Although such an arrangement has reduced the air loss from the air-bearing space, this arrangement requires proportionately more power for the drive means due to the frictional contact of the contact strips. Furthermore, due to being in constant physical contact, the material employed for the contact strips wears, thus necessitating replacement and additional material usage along with high labor costs.

The side-sealing means according to the present invention are suitable for use in any air-supported transport system. Generally, these side-sealing means comprise first and second means attached to the belt and support body and define a channel extending therebetween. The first means have an arcuate portion in a cross-sectional configuration, and the second means are adapted to direct a source of pressurized air from the air-bearing space against the arcuate portion of the first means whereby the vortex or spiral motion is given to the pressurized air. This motion imparted to the pressurized air directs the same away from the outlet channel thus minimizing the air loss. In this system, all frictional contact between the first and second means is avoided.

Having thus generally described the invention, reference will be made to the accompanying drawings, illustrating preferred embodiments, and in which:

FIG. 1 is a cross-sectional view of the collapsible loop guide way;

FIG. 2 is an expanded cross-sectional view of the edge seal of FIG. 1 in a pressurized condition;

FIG. 3 is an expanded cross-sectional view of the side-sealing means in a collapsed static condition;

FIG. 4 is a schematic cross-sectional view showing how the segments may be stacked;

FIG. 5 is a longitudinal cross section of the collapsible loop guide way;

FIG. 6 is a longitudinal cross section of the collapsible loop guide way illustrating the air-bearing and duct;

FIG. 7 is a plan view of a typical multi-directional loop guide way system;

FIG. 8 is a cross-sectional view showing the pre-set tilt position of loop guide way at an unloading station;

FIG. 9 is a cross-sectional view showing a controlled tilt station for the collapsible loop guide way; and FIG. 10 is a perspective view of an air dam.

Referring now in greater detail and by reference characters to the drawings, FIG. 1 illustrates in cross-sectional view a portable collapsible loop guide way transport system designated generally by reference numeral 10. Transport system 10 takes the form of a continuous loop of flexibly coupled relatively rigid platforms often referred to as "loop segments" 12. It can be observed that loop segments 12 are somewhat V-shaped in cross section and form a central trough which is adapted to accept a suitable type of freight or payload.

The various loop segments 12 are supported on collapsible air bags or so-called duct membranes 18 which are flexible and formed of a relatively thick plastic material or the like. The air bags 18 also serve as continuous guide way foundation pads for supporting the loop segments 12. Each of the air bags 18 includes internal air ducts 20 for receiving air under pressure from stationery pumping stations (not shown) which may be located at periodic intervals along the longitudinal length of the transport system, as for example, one half mile intervals. Diaphragm support bulkheads 35 are interconnected by means of a bottom bulkhead connector 31 and an intermediate connector 33.

The platform or belt formed of the loop segments 12 may be driven by suitable means such as a set of dual traction wheels (not shown) and which are again located at periodic intervals along the length of the transport system such as one half mile intervals. These traction wheels will contact a continuous drive strap 22 which is in turn operatively connected to and depends from the various loop segments 12 along the air bags 18, which as indicated previously, function as a continuous guide way. AA diaphragm 24 is located on the upper portion of the air bags 18 and is air pervious to the air under pressure in air ducts 20 to thereby form an air bearing 16 between the lower wall of the various segments 12 and air bags 18. In this connection, edge seal 28 may be employed along the transverse margin of the diaphragm 24 and the loop segments 12 in order to maintain the air-bearing space and minimize air loss therefrom.

In one aspect of the invention, a cover member schematically shown as 36, (which may be carried by pressurized air), can be removably disposed over the loop segments 12 for protecting the freight contained on the segments 12. In this regard, the cover 36 may be integral with the air bags and openable with respect thereto, or it may be merely disposed over the segments 12. It should also be observed in this regard that the cover member could be designed and supported so as to carry passengers in an environment protected from the weather elements.

FIG. 2 of the drawings illustrates an expanded view of the edge or side seal 28 employed in FIG. 1. Thus, as illustrated, the side-sealing means employs a first member 32 depending from the underside of belt segments 12 and a second member 34 attached to membrane 24 of air bag 18. Together, members 32 and 34 act in a co-operative manner as will be described in greater detail so as to minimize the air loss from air-bearing space 16.

As illustrated, member 32 has a portion of which is U-shaped comprising a base 36 and arms 38 and 42. Arm 42 is continued and reversed back upon itself so as to form a "tear-drop" configuration. Member 32, as discussed previously, depends from belt segments 12 and is attached thereto at base portion 36 and a continuation flange 44. Suitable means of attachments such as adhesives, mechanical means, etc. may be utilized. Attached to arm 42 and forming a downward extension thereof is a flexible flap 40. Flap 40 may be of any suitable flexible material such as a plastic, thin metal or the like. It also may be attached to the arm 42 by suitable means known to those skilled in the art.

Member 34 is adapted to allow pressurized air from air-bearing space 16 and direct it substantially parallel to arm 38 of member 32 in such a manner that the flow of pressurized air will follow the contour of the U-shaped member 32 and thus assume a "whirlpool" or "vortex" configuration.

Member 34 may be attached to membrane 24 of air bag 18 along the longitudinally extending edge thereof. Component 34 comprises two upwardly extending elements 48 and 50 defining a trough therebetween and the longitudinally extending channel or air outlet 52. Element 50 is apertured or provided with other suitable means for allowing the passage of pressurized air from air-bearing space 16 into a trough 54 defined by elements 48 and 50. From trough 54, the pressurized air will "enter" a channel 52 and, as aforementioned, be directed against arm 38 and base 36 of member 32 in such a manner so as to assume a vortex configuration.

At the same time, flap 40 will, due to its flexibility, assume the position shown by dotted line 40A, due to the pressure within air-bearing space 16.

As can be seen, a channel or gap 56 is provided between arm 38 of member 32 and element 48 of member 34. Thus, in operation, the two members do not contact each other and little friction is encountered. However, at the same time, due to the vortex configuration which the flow of air assumes within the U-shaped member 32, there is little loss of air through channel 56. Thus, side-sealing means 28 substantially reduces the friction and at the same time reduces the air loss from air-bearing space 16.

FIG. 3 illustrates side-sealing means 28 in a static or "collapsed" condition wherein there is no pressure differential between the air-bearing space 16 and the outside. In this condition, it may be seen that the components of the side-sealing means are protected from damage due to their contacting each other by the teardrop shaped element or "bumper strip" 41. As can be seen, bumper strip 41 is of a height or depth great enough to contact a bumper strip 43 so as to prevent members 32 and 34 from contacting each other. Similarly, flap 40 is flexible and will thus bend when it contacts bumper strip 43.

Referring back to FIG. 1, it may be seen that four side-sealing means 28 are employed in the illustrated embodiment, thus, the side-sealing means are employed to define two separate air-bearing spaces 16 which support the carrier belt segments 12.

One unique feature of the transport system of the present invention is that it can be readily disassembled and stacked in relatively small components as illustrated by FIG. 4 of the drawings. It may be observed that the various loop segments 12 are designed so that they are nestable with each other. In this respect, and with reference to FIG. 1, it might be remarked that membrane 24 and diaphragm support bulkhead 35 are hinged by a suitable hinging arrangement 37, whereby bulkhead 35 may be swung in an outward manner as indicated by the arrows so as to lie in juxtaposition to membrane 24. Furthermore, the air bags or so-called duct membranes 18 are collapsible into a very small compact unit. Thus, these air bags, bulkheads, and diaphragms could be interposed between adjacent vertically registered loop segments in the manner illustrated. While the embodiment in FIG. 3 illustrates only four such segments in vertical registration, it may be observed that these components can be stacked to any desired height for shipping and/or storage.

Referring to FIG. 5, there is illustrated the drive means in longitudinal cross section. As illustrated, disposed downwardly of carrier belt segments 12 are drive strap support members 60. Furthermore, there are provided means of interconnecting segments 12 comprising a segment tension/compression coupling 62. Tension/compression couplings 62 are adapted to be expandable and contractable so as to articulately connect carrier belt segments 12. Also shown in this figure is one of the dual traction wheels 64 rotating in the direction shown by the arrow and which is adapted to contact the continuous drive strap 22. Thus, movement indicated by the arrow is imparted to drive strap 22.

A further longitudinal sectional view of the closed loop transport system is shown in FIG. 6. In this drawing, the flexibly coupled segments 12 have between the adjacent segments a coupling seal membrane designated generally by reference numeral 66. It may also be noted that pressurized air from air duct 20 is supplied through aperture 68 in flexible membrane 24 so as to supply pressurized air to air-bearing space 16. Optionally associated with aperture 68 is an air transfer reed valve 70.

Also shown in this drawing are a pair of air dams 72 which are transversely mounted on the segments 12 forming the carrier belt. These air dams 72 are capable of flexing and the flex position is indicated by dotted lines 74.

FIG. 10 illustrates an expanded view of the air dams according to the present invention and reference will now be made thereto. Each air dam 72 is suitably attached to a carrier belt segment 12 and has a substantially triangular configuration with the base of the dam being attached to belt segments 12. Within the side walls 76 of the air dam 72 are a plurality of air dam pressure control apertures 78. These air dam pressure control appertures 78, as illustrated, are covered interiorly of the triangularly shaped air dam 72 by flexible transversely extending flaps 80.

Referring to FIG. 8, there is illustrated the transport system of the present invention in a tilted position whereby, the carrier belt segments 12 are adapted to unload the commodity placed thereupon. Inasmuch as the air bags 18 are flexible, they may be shifted in the manner illustrated in FIG. 8. According to one aspect of this invention, a segment of the system may be permanently tilted in this configuration so as to unload the commodity mounted on the segments 12. In other words, the system according to the present invention could include the substantially automatic unloading platform wherein the air bags are always at a predetermined angle so as to automatically disembark the cargo on the belt. In this embodiment, they have provided for guide rollers 84 which are adapted to guide the segments 12 when in the tilted or unloading configuration and retain them in their position.

FIG. 9 illustrates an embodiment wherein the air bags are normally in an upright position but may be tilted so as to disembark the cargo on the segments 12. As illustrated, they have provided for a housing or foundation 86 adapted to substantially surround the air bags 18. Contacting the housing 86 are tilt drive rollers 88, which may be rotated so as to unload the commodity carried by the system. Further lateral support roller 90 is shown which is adapted to support the system when in the tilted position.

FIG. 7 illustrates one continuous transport configuration which may be utilized with the transport system of the present invention. This type of looped configuration can be used, for example, in mining or logging operations. In this case, it may be observed that the transport system extends between the place of operation designated generally by reference numeral 94 to an unloading or process site 96. As the system is a continuous loop system, the loop can also be utilized to send necessary materials from the site of utilization 96 to site 94.

Although this invention has been described with respect to one embodiment, it is recognized that modifications may be made thereto without departing from the spirit and scope of this invention. Thus, for example, the side-sealing means has been described with respect to the preferred embodiment thereof. Side-sealing means employing a separate bumper means which is not integral with one of the members hereinabove described are deemed to be equivalent to the preferred embodiment.

I claim:

1. A transport system comprising a collapsible support body of at least two parallel flexible air bags, a continuous loop of flexibly coupled loop segments, said continuous loop being disposed above said collapsible support body for at least a portion of its length, an air-bearing space intermediate said continuous loop and said support body, means for supplying a source of pressurized air to said support body, means associated with the surface of said support body over which said continuous loop passes for supplying pressurized air to said air-bearing space from said support body, said air bags having upper surfaces which are inclined relative to each other, the lower surface of said continuous loop being V-shaped such that said continuous loop of flexibly coupled loop segments is centered between said air bags and supported thereon by two continuous air-bearing spaces intermediate said loop and said air bags, drive means operatively associated with said continuous loop for driving the same, and side-sealing means adapted to provide sealing contact between said continuous loop and said support body.

2. The transport system of claim 1, wherein said means associated with the surface of said support body for supplying pressurized air to said air-bearing space comprises means forming a plurality of apertures within said surface of said support body over which said continuous loop passes.

3. A closed loop transport system as defined in claim 1, wherein a portion of said transport system is tilted with respect to the horizontal whereby goods placed on said continuous loop at an embarkation point will be automatically discharged.

4. The transport system of claim 1, wherein said flexibly coupled loop segments are coupled by means of a tension/compression coupling.

5. A transport system comprising a collapsible support body of a plurality of parallel flexible air bags, said air bags having upper surfaces which are inclined relative to each other, a continuous loop of flexibly coupled loop segments having a lower V-shaped surface, said continuous loop of flexibly coupled loop segments is centered between said air bags, an air bearing space intermediate said continuous loop and said support body, means for supplying a source of pressurized air to said parallel flexible air bags, means associated with the surface of said support body over which said continuous loop passes for supplying pressurized air to said air-bearing space from the air bags, a continuous drive strap operatively associated with said continuous loop, drive traction wheels in spaced-apart locations to drive said drive strap to thereby drive said continuous loop, and side sealing means adapted to provide sealing contact between said continuous loop and said air bags.

6. A transport system comprising a collapsible body, a continuous loop of flexibly coupled loop segments, said continuous loop being disposed above said collapsible support body for at least a portion of its length, an air-bearing space intermediate said continuous loop and said support body, means for supplying a source of pressurized air to said support body, means associated with the surface of said support body over which said continuous loop passes for supplying pressurized air to said air-bearing space from said support body, drive means operatively associated with said continuous loop for driving the same, side sealing means adapted to provide sealing contact between said continuous loop and said support body, a housing, said housing at least partially surrounding said support body, tilt drive rollers being adapted to tilt said housing and said support body, and lateral support rollers adapted to support said continuous loop when said housing it tilted.

7. A transport system comprising a collapsible support body of a plurality of parallel flexible air bags having upper surfaces which are inclined relative to each other, a continuous loop of flexibly coupled loop segments the lower surfaces of which are V-shaped such that said continuous loop of flexibly coupled loop segments is centered between said air bags, means interconnecting said parallel flexible air bags, said continuous loop being disposed above said collapsible support body for at least a portion of its length, an air bearing space intermediate said continuous loop and said support body, means for supplying a source of pressurized air to said support body, means associated with the surface of said support body over which said continuous loop passes for supplying pressurized air to said air-bearing space from said support body, drive means operatively associated with said continuous loop for driving the same, and side sealing means adapted to provide sealing contact between said continuous loop and said support body.

8. A transport system comprising a collapsible support body, a continuous loop of flexibly coupled loop segments, said continuous loop being disposed above said collapsible support body for at least a portion of its length, an air-bearing space intermediate said continuous loop and said support body, means for supplying a source of pressurized air to said support body, means associated with the surface of said support body over which said continuous loop passes for supplying pressurized air to said air-bearing space from said support body comprising means forming an air pervious membrane whereby said air pervious membrane permits the passage of air between said support body and said air-bearing space, drive means operatively associated with said continuous loop for driving the same, and side sealing means adapted to provide sealing contact between said continuous loop and said support body.

9. The transport system of claim 8, comprising support bulkheads adapted to support said air pervious membrane, and hinging means, said hinging means connecting said air pervious membrane and said support bulkheads.

10. A transport system comprising a collapsible support body, a continuous loop of flexibly coupled loop segments, said continuous loop being disposed above said collapsible support body for at least a portion of its length, at least one air dam extending transversely of at least one of said loop segments, an air-bearing space intermediate said continuous loop and said support body, means for supplying a source of pressurized air to said support body, means associated with the surface of said support body over which said continuous loop passes for supplying pressurized air to said air-bearing space from said support body, drive means operatively associated with said continuous loop for driving the same, and side sealing means adapted to provide sealing contact between said continuous loop and said support body.

11. In a transport system including a carrier belt, a support body, an air-bearing space intermediate the underside of said carrier belt and a portion of said support body, and side-sealing means, the improvement wherein said side-sealing means comprises first and second means attached to the carrier belt and the support body, said first and second means forming an outlet channel therebetween, said first means having an arcuate portion in cross-sectional configuration, said second means adapted to direct a source of pressurized air from said air-bearing space against said arcuate portion of said first means whereby said pressuurized air will assume a vortex configuration.

12. In a transport system including a carrier belt, a support body, an air-bearing space intermediate the underside of said carrier belt and a portion of said support body, and side sealing means, the improvement wherein said side sealing means comprises first and second means attached to the carrier belt and the support body, said first and second means forming an outlet channel therebetween, said first means having an arcuate portion in cross-sectional configuration, said second means adapted to direct a source of pressurized air from said air-bearing space against said arcuate portion of said first means whereby said pressurized air will assume a vortex configuration, and bumper means, said bumper means adapted to protect said first and second means when the air-bearing space is deflated.

13. The apparatus of claim 12, wherein said bumper means and one of said first or second means are integral means.

14. A transport system comprising a collapsible support body, a continuous loop of flexibly coupled loop segments, said continuous loop being disposed above said collapsible support body for at least a portion of its length, an air-bearing space intermediate said continuous loop and said support body, means for supplying a source of pressurized air to said support body, means associated with the surface of said support body over which said continuous loop passes for supplying pressurized air to said air bearing space from said support body, drive means operatively associated with said continuous loop for driving the same, and side sealing means, said side sealing means comprising first and second means attahced to the carrier belt and the support body, said first and second means forming an outlet channel therebetween, said first means having an arcuate portion in cross-sectional configuration, said second means adapted to direct a source of pressurized air from said air-bearing space against said arcuate portion of said first means whereby said pressurized air will assume a vortex configuration.

15. A transport system comprising a collapsible support body of a plurality of parallel flexible air bags, said air bags having upper surfaces which are inclined relative to each other, a continuous loop of flexibly coupled loop segments having a lower V-shaped surface, said continuous loop being disposed above said collapsible support body for at least a portion of its length wherein said continuous loop of flexibly coupled loop segments is centered between said air bags, an air-bearing space intermediate said continuous loop and said support body, means for supplying a source of pressurized air to said parallel flexible air bags, means associated with the surface of said air bags over which said continuous loop passes for supplying pressurized air to said air-bearing space from the air bags, a continuous drive strap operatively associated with said continuous loop, drive traction wheels in spaced-apart locations to drive said drive strap to thereby drive said continuous loop, and side sealing means adapted to provide sealing contact between said continuous loop and said air bags, said side sealing means comprising first and second means attached to the carrier belt and the support body, said first and second means forming an outlet channel therebetween, said first means having an arcuate portion in cross-sectional configuration, said second means adapted to direct a source of pressurized air from said air-bearing space against said arcuate portion of said first means whereby said pressurized air will assume a vortex configuration.

16. The transport system of claim 15, including lateral support rollers and tilt drive rollers, said tilt drive rollers being adapted to tilt said air bags and said lateral support rollers being adapted to support said continuous loop when said air bags are tilted.

17. The transport system of claim 15, additionally comprising at least one air dam, said air dam extending transversely of at least one of said loop segments.

18. The transport system of claim 17, wherein said air dams are flexible air dams permitting the ingress and egrss of pressurized air.

19. The transport system of claim 15, wherein said side sealing means are provided along each longitudinally extending edge of each of said pair of parallel flexible air bags.

20. A transport system comprising a collapsible support body, a continuous loop of flexibly coupled loop segments, said continuous loop being disposed above said collapsible support body for at least a portion of its length, at least one air dam extending transversely of at least one of said loop segments, an air-bearing space intermediate said continuous loop and said support body, means for supplying a source of pressurized air to said support body, means associated with the surface of said support body over which said continuous loop passes for supplying pressurized air to said air-bearing space from said support body, drive means operatively associated with said continuous loop for driving the same, and side sealing means adapted to provide sealing contact between said continuous loop and said support body, said side sealing means comprising first and second means attached to the carrier belt and the support body, said first and second means forming an outlet channel therebetween, said first means having an arcuate portion in cross-sectional configuration, said second means adapted to direct a source of pressurized air from said air-bearing space against said arcuate portion of said first means whereby said pressurized air will assume a vortex configuration.

21. The transport system of claim 20, including drive means comprising a continuous drive strap operatively associated with said continuous loop, and drive traction wheels in spaced apart locations adapted to drive said drive strap to thereby drive said continuous loop.

22. The transport system of claim 20, wherein said flexibly coupled loop segments are coupled by means of a tension/compression coupling.

23. In a transport system including a carrier belt, a support body, an air-bearing space intermediate the underside of said carrier belt and at least a portion of said support body, and side sealing means, the improvement wherein said side sealing means comprises first means attached to the under side of said carrier belt, said first means having a generally U-shaped cross-sectional configuration, second means attached to said support body and having an interior cavity, said second means including means permitting the ingress of pressurized air from said air-bearing space to said cavity and means permitting the egress of air from said cavity against said U-shaped first means, whereby said pressurized air will assume a vortex configuration, said first and second means being in a spaced-apart relationship forming an outlet channel therebetween, the whole arrangement being such that said pressurized air assuming a vortex configuration minimizes the loss of pressurized air through said outlet channel.

24. The apparatus of claim 23, additionally comprising bumper means adapted to maintain said first and second means in a spaced apart relationship when said air-bearing space is deflated.

* * * * *